J. P. LAVIGNE.
VALVE.
APPLICATION FILED APR. 12, 1910.
1,008,416.
Patented Nov. 14, 1911.
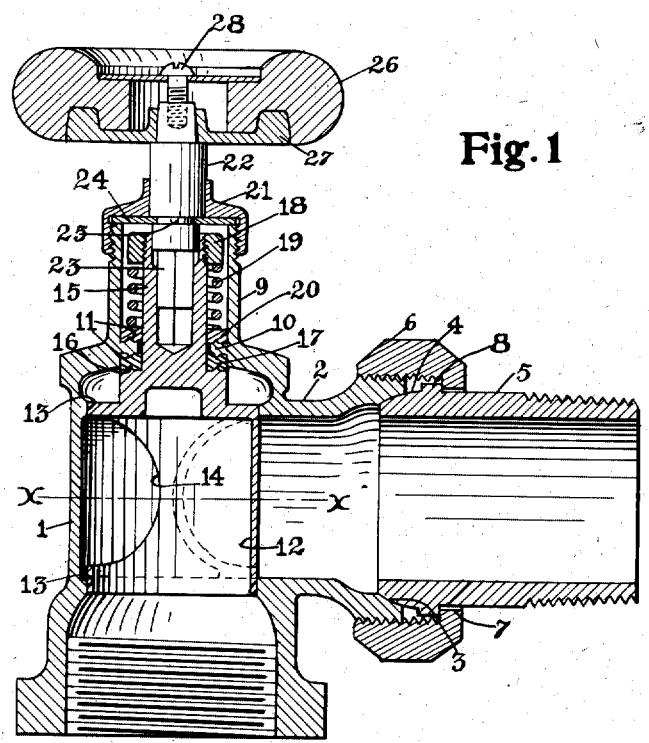
Fig. 1
Fig. 2
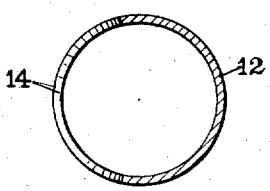
Fig. 3
Witnesses
C. M. Shannon.
A. M. Doir.
Inventor
JOSEPH P. LAVIGNE
By
Attorneys

UNITED STATES PATENT OFFICE.

JOSEPH P. LAVIGNE, OF DETROIT, MICHIGAN.

VALVE.

1,008,416.   Specification of Letters Patent.   Patented Nov. 14, 1911.

Application filed April 12, 1910.   Serial No. 554,910.

*To all whom it may concern:*

Be it known that I, JOSEPH P. LAVIGNE, a citizen of the United States of America, residing at Detroit, in the county of Wayne and State of Michigan, have invented certain new and useful Improvements in Valves, of which the following is a specification, reference being had therein to the accompanying drawings.

This invention relates to valves and more particularly to a type adapted for use on hot water lines or like places where the heat is liable to injure ordinary packing.

One object of the invention is to provide a closure for a valve which is held in normal position regardless of wear of the packing and which is adapted likewise to act as a shield for the packing.

The invention consists in the matters hereinafter set forth, and more particularly pointed out in the appended claims.

In the drawings, Figure 1 is a view in longitudinal section through a valve that embodies features of the invention; Fig. 2 is a view in detail of a valve closure in section on line $x$—$x$, Fig. 1; and Fig. 3 is a view in detail of a yoke washer for a valve stem.

Referring to the drawings, a substantially cylindrical casing 1, of suitable material has its lower open end interiorly screwthreaded or otherwise fitted for connection with a pipe. A tubular nipple 2 extends radially from the casing. This nipple may be arranged in any way for connection with a pipe, but preferably has a concave annular face 3 on which the correspondingly convex face 4 of a pipe coupling 5 is seated, the latter being held in place by a collar 6 that is screwthreaded on to the nipple and has an inner annular flange 7 engaging a circumferential rib 8 on the coupling. The outer end of the coupling is exteriorly screwthreaded or otherwise adapted for detachable engagement with the pipe. A cylindrical bonnet 9 that is preferably formed integrally with the upper end of the casing 1 has an internal annular flange 10 whose upper and lower faces are provided with gasket retaining ribs or projections 11. A cylindrical closure 12 is rotatable in bearing ribs 13 on the inner face of the casing with its lower open end in register with the lower opening of the casing. A cylindrical port 14 in the closure wall is adapted to be turned into register with the bore of the nipple 2.

A stem 15 preferably integral with the upper end of the closure extends into the bonnet through the rib 10, an annular shoulder 16 being formed thereon to abut the gasket 17 interposed between it and the rib 10. An annular nut 18 is screwthreaded on to the upper end of the stem or is otherwise adjustable longitudinally thereof and a spring 19 encircles the stem in compression between the nut 18 and a gasket or washer 20 resting on the upper face of the rib 10. A centrally apertured cap 21 is screwthreaded or otherwise detachably interlocked with the upper end of the bonnet 9. A valve stem 22 is rotatable in the cap 21 and has a squared, polygonal, or splined inner end 23 in nonrotatable sliding engagement with a corresponding axial socket in the closure stem 15. A yoke washer 24 lying between the upper end of the bonnet 9 and the cap 21 and engaging the annular groove 25 in the valve stem prevents longitudinal movement of the latter. A suitable hand wheel 26 is nonrotatably fastened to the upper end of the stem as by a socket plate 27 with aperture engaging the squared, upper end of the stem 22 a retaining screw 28 holding the parts together. By this arrangement of parts, a valve closure is held in position regardless of the wear of the gaskets which prevent leakage around the closure stem. At the same time hot water or the like passing through the casing does not strike directly upon the packing and therefore does not injure the latter. The manipulation of the closure by the handle does not effect the packing only through the friction caused by the retaining spring, the yoke washer taking up any end thrust imparted to the valve stem by the operator.

Obviously, changes in the details of construction may be made without departing from the spirit of the invention, and I do not care to limit myself to any particular form or arrangement of parts.

What I claim as my invention is:—

1. A valve comprising a casing having a cylindrical bore provided with inlet and outlet openings communicating therewith, a bonnet on the casing in axial alinement with said bore, an inner annular rib in the bonnet, a cylindrical closure fitted for rotation in said bore and having a conduit adapted to connect and disconnect said inlet and outlet openings, a shouldered stem on the closure and projecting beyond said rib and terminating within said bonnet, a gasket between said rib and the stem-shoulder, a collar on the stem, a spring between the bonnet-rib and collar, a cap on the bonnet and an independent stem-actuator in corotative engagement with said stem, and loosely passing through said cap and having a shoulder adjacent the underside of the cap, and a washer in engagement with said shoulder and cap for holding said actuator against pulling out of the cap.

2. A valve comprising a casing having a cylindrical bore and provided with inlet and outlet, openings communicating therewith, a bonnet on the casing in axial alinement with said bore, an inner annular rib in the bonnet, a cylindrical closure fitted for rotation in said bore and having a conduit adapted to connect and disconnect said inlet and outlet openings, a shouldered stem on the closure and projecting beyond said rib and terminating within said bonnet, a gasket between said rib and the stem-shoulder, a collar on the stem, a spring between the bonnet-rib and collar, a cap on the bonnet, and an independent stem-actuator in corotative engagement with said stem and loosely passing through said cap and having an annular groove, and a washer in said groove and clamped between the cap and the end of the bonnet for holding said actuator against longitudinal movement in either direction.

In testimony whereof I affix my signature in presence of two witnesses.

JOSEPH P. LAVIGNE.

Witnesses:
C. R. STICKNEY,
A. M. DORR.